United States Patent [19]

Fuchsberger

[11] Patent Number: 4,812,902

[45] Date of Patent: Mar. 14, 1989

[54] METHOD AND APPARATUS FOR ADJUSTING COLOR SATURATION IN ELECTRONIC IMAGE PROCESSING

[75] Inventor: Hermann Fuchsberger, Ismaning, Fed. Rep. of Germany

[73] Assignee: AGfa-Gevaert Aktiengesellschaft, Leverkusen, Fed. Rep. of Germany

[21] Appl. No.: 85,864

[22] Filed: Aug. 14, 1987

[30] Foreign Application Priority Data

Aug. 29, 1986 [DE] Fed. Rep. of Germany ....... 3629469

[51] Int. Cl.[4] .......................... G03F 3/08; H04N 1/46; H04N 9/64
[52] U.S. Cl. ........................ 358/80; 358/40; 358/75
[58] Field of Search ........ 358/75, 80, 27, 28, 358/29, 29 C, 36, 37, 39, 40, 76, 78

[56] References Cited

U.S. PATENT DOCUMENTS

| | | | |
|---|---|---|---|
| 3,835,243 | 9/1974 | Nagaoka | 358/36 |
| 4,058,828 | 11/1977 | Ladd | 358/80 |
| 4,661,843 | 4/1987 | Sekizawa et al. | 358/80 |
| 4,706,111 | 11/1987 | Abe et al. | 358/36 |
| 4,731,662 | 3/1988 | Uidagawa et al. | 358/80 |
| 4,768,082 | 8/1988 | Hiratsuka et al. | 358/80 |

FOREIGN PATENT DOCUMENTS

| | | | |
|---|---|---|---|
| 0168818 | 1/1986 | European Pat. Off. | |
| 60-83488 | 5/1985 | Japan | 358/29 C |
| 60-254985 | 12/1985 | Japan | 358/27 |
| 60-256292 | 12/1985 | Japan | 358/27 |
| 8603087 | 5/1986 | PCT Int'l Appl. | 358/27 |

Primary Examiner—James J. Groody
Assistant Examiner—Randall S. Svihla
Attorney, Agent, or Firm—Peter K. Kontler

[57] ABSTRACT

A method for adjusting the color saturation during electronic image processing, in which a two-dimensional original image is electro-optically scanned along rows and columns for three primary colors and the resulting image signals are transformed into a luminance signal Y and two color-difference or chrominance signals C1, C2. A pre-selected adjustment of color saturation is used, in which, in accordance with a non-linear characteristic curve, small chrominance signals C1, C2 are more amplified than larger chrominance signals C1, C2 corresponding to a higher degree of saturation.

8 Claims, 7 Drawing Sheets

METHOD AND APPARATUS FOR ADJUSTING COLOR SATURATION IN ELECTRONIC IMAGE PROCESSING

Cross-reference to related applications, assigned to the assignee of the present invention:

Method of Electronically Improving the Sharpness and Contrast of a Colored Image For Copying, inventors Eduard Wagensonner et al., Ser. No. 085,942, filed Aug. 14, 1987.

Method and Apparatus for the Reproduction of Originals with Image Storage and Evaluation, inventors Eduard Wagensonner et al., Ser. No. 085,941 filed Aug. 14, 1987.

Method of and Apparatus for Electronic Contrast Enhancement of Reproductions of Two-Dimensional Transparent Original Images, inventors Hermann Fuchsberger et al., Ser. No. 085,865 filed Aug. 14, 1987.

Method of Correcting Color Saturation in Electronic Image Processing, inventor Hermann Fuchsberger, Ser. No. 085,977 filed Aug. 14, 1987.

BACKGROUND OF THE INVENTION

The invention relates generally to a method and apparatus for adjusting color saturation in an electronic image processing system, in which the original images are electro-optically scanned in three primary colors by rows and columns, and, more particularly, to a method and apparatus in which the image signals are transformed to a luminance signal Y and two color difference signals or chrominance signals $C_1$, $C_2$.

In the reproduction of colored original images (positive-positive) or the manufacture of color photographic positive pictures from color negative originals, greater and greater reliance is being placed on electronic image processing and the use of color correction circuits. See, for example, European Patent Applications Nos. 70 680, 131 430, and 168 818; European Patent Application No. 168 818 corresponds to U.S. Pat. No. 4,661,843.

The fundamentals of electronic color correction are described in, for example, the books *Farbmetrick und Farbfernsehen* (Color Measurement and Color Television), by H. Lang, pages 326 to 334 and 431ff, R. Oldenbourg-Verlag publishing house, Munich/Vienna 1978, and *Digital Image Processing*, by W. K. Pratt, particularly pages 50–90 and 155–161, John Wiley & Sons, New York/Chicester/Brisbane/Toronto, 1978.

Transformation into luminance and chrominance signals is known in principle in the video art. There it is directed primarily to using electronic means to undertake color corrections if reception-induced color errors are present (e.g. color distortion) or if, during transmission, false color casts arise, which must be compensated.

Experience has shown that, for production of optimal positive images, e.g. on color copier material, the following image parameters must be adjusted or be capable of being adjusted:

(a) color balance,
(b) color saturation,
(c) global contrast (gradation).

There is often the difficulty that these parameters cannot be adjusted independently of one another. When one adjusts the gradation, one finds that, for example, the color saturation has changed. Nevertheless, an independent adjustment can be carried out when the brightness-linear image signals are transformed into luminance and chrominance signals, as is usual in the television art (the so-called RGB-to-YUV transformation).

The desired adjustment of the color saturation can be done continuously with a potentiometer or in steps using individual keys. It has been found that, in order for the images to be classified as optimal by an observer, the production of color photographic prints from color negatives or color positives must satisfy special criteria, some of which relate to physiology. In particular, it has been shown that the adjustment of color saturation becomes critical when weakly saturated regions are present next to highly saturated regions in the original image. In practice, the color channels for the chrominance signals (color difference signals) have a limited modulation range, so that the case can arise that increasing the color saturation in one or both channels causes the modulation limit to be reached or exceeded. This over-modulation leads to an undesired change in coloration, i.e. to false coloration.

OBJECTS AND SUMMARY OF THE INVENTION

This is where the present invention comes in. It is an object of the present invention to provide new electronic means to avoid overshooting the limits of the representable color space, and thus overmodulation effects leading to false coloration, upon external adjustment or increase in color saturation.

Briefly, the present invention achieves this by improving the method described above, by employing a predetermined, non-linear characteristic curve for adjustment of color saturation, according to which small chrominance signals $C_1$, $C_2$ are more amplified than chrominance signals corresponding to a higher saturation level. This means that, upon making an intended improvement of the color saturation, those image portions with weak saturation are amplified more than those which are already relatively strongly saturated. The predetermined adjustment of the color saturation thus corresponds to the desired amplification scale.

For transformation of the image signals into one luminance signal specifying the brightness or light density and two chrominance signals containing the color information, preferably the RGB-to-YUV transformation, known from the television art, is used. In this transformation, each triplet of three primary color image signals R,G,B is associated with the luminance signal Y and two chrominance signals U,V.

The sublinear characteristic curve for the amplicification of the chrominance signals thus has a smaller slope at greater modulations or amplitudes. The drop-off of the slope can either be in individual steps, so that the characteristic line is assembled from individual segments with differing slopes, or may be steady and continuous, corresponding to a convexly bent curve. These measures are successful in many cases in improving image quality from the standpoint of color saturation. This is true, first of all, for original images in which the color saturation needs increasing over the entire image region, e.g. when the original image is an under-exposed color negative.

An overmodulation past the modulation limits, imposed by the system, of the chrominance channels, and the resulting false colorations, can be avoided in most cases if an amplification characteristic curve is established which runs horizontally above a predetermined limit value of chrominance signals $C_1$, $C_2$. Chrominance signals which are already at or above this limit
} value will not be further amplified. This limit value is preferably selected to be smaller than the chrominance channel modulation limits imposed by the system.

A further improvement can be achieved if one makes the modulation limit for the chrominance signals C1, C2 dependent upon the respective luminance signal Y, in accordance with the transformation equations. Thus, one operates not with a constant modulation limit, as in the preceding embodiment, but rather adjusts the modulation limit in dependence upon the luminance signal Y, according to the transformation equations. These measures achieve, in practically all important cases, an improvement of image quality in the sense of expressed color contrasts, by targeted increasing of the color saturation.

In the worst case, small color falsifications can still occur in this process, in the case of color tones which are characterized by strongly differing chrominance components, so that the modulation limit has already been reached in one chrominance channel, while in the other channel, a further increase in saturation could be carried out without overmodulation. This problem can be dealt with by a further refinement of the inventive method, according to which, upon the modulation limit in one of the two chrominance channels being reached, the amplification in the other channel is limited to the value reached at the modulation limit. This solution, which requires a greater hardware investment, therefore represents an optimal solution and a further expansion module.

The novel features which are considered as characteristic of the invention are set forth in particular in the appended claims. The improved color saturation adjustment method, as well as the construction and mode of operation of the improved color saturation adjustment, together with additional features and advantages thereof, will, however, be best understood upon perusal of the following detailed description of certain specific embodiments, with reference to the accompanying drawing.

DESCRIPTION OF THE PREFERRED EMBODIMENTS

Figure 1:
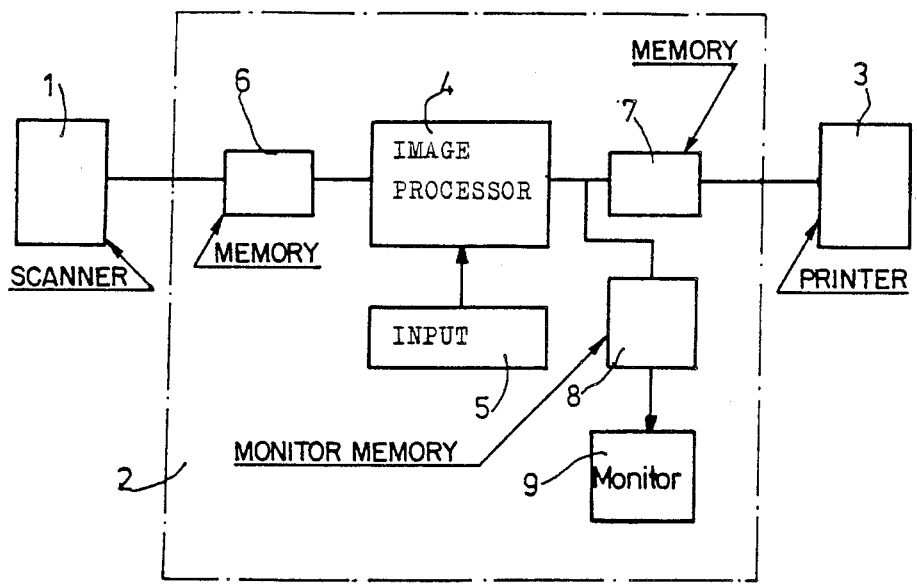
FIG. 1 shows the three main elements of an image processor, namely the image sampling apparatus or scanner, the actual image processing portion, and the image output apparatus (printer)

As shown in FIG. 1, the original image is sampled along vertical lines with a scanner 1, so than an electronic image signal is generated for every image point or pixel. Scanner 1 comprises a CCD (Charge Coupled Device) line sensor oriented along a horizontal line, which travels with constant speed in the vertical direction over the image surface, scanning. The sampling is done sequentially for the three primary colors red, green, blue (RGB). For this purpose, special color filters are pivoted into the light path between the CCD line sensor and the original image.

The electro-optically sampled image comprises 2048 image points per line (horizontal) and 1024 lines (vertical), so that each image has in the aggregate 2048×1024 image elements (pixels), to each of which are assigned three primary color values RGB. A correction circuit (not shown) assures the CCD-specific defects, e.g. differing sensitivities of the CCD elements and dark current photocells, are eliminated. The corrected image signals are thereafter digitized. Only then does the actual electronic image processing occur, as summarized in FIG. 1 in the dot-dashed-line block 2.

The last element in the image processing chain is the image output device 3, here a cathode ray printer, which transforms the electrical image signals back into an optical image, which then exposes the photographic recording material, e.g. color negative paper. The significant feature is that, in the printer, the optical image is built up point-for-point by transformation of the electrical image signals. Therefore, in principle, one can subject each pixel to image processing and then output it at coordinates on the recording medium corresponding to its coordinates on the original image.

The actual electronic image processing occurs in an image processor 4 which can be externally controlled over an input 5. Upstream and downstream of the image processor 4, the image is stored in respective memories 6 and 7 (SP1 and SP2). These intermediate memories enable printer 3 to retrieve and plot an image from memory 7 while a new image is simultaneously being read into memory 6 and processed by image processor 4. The three basic steps of sampling (scanner 1), image processing in image processor 4, and image recording (printer 3) are thus decoupled. The image which has been processed in image processor 4 and is intended for recording can be placed in intermediate storage in a monitor memory 8 and displayed on a monitor 9. These blocks or steps are classified as part of image processing 2.

The present invention is directed primarily to special electronic measure for image matching and image enhancement, for which, in the final analysis, the evaluation criteria are the visual impression. Specifically, the image processor has the following tasks and functions:

(a) adjustment of the color balance,
(b) adjustment of the color saturation in multiple shades or steps,
(c) image-dependent adjustment of the gradation,
(d) image sharpening in areas of fine image details (higher local frequencies).

Figure 2:
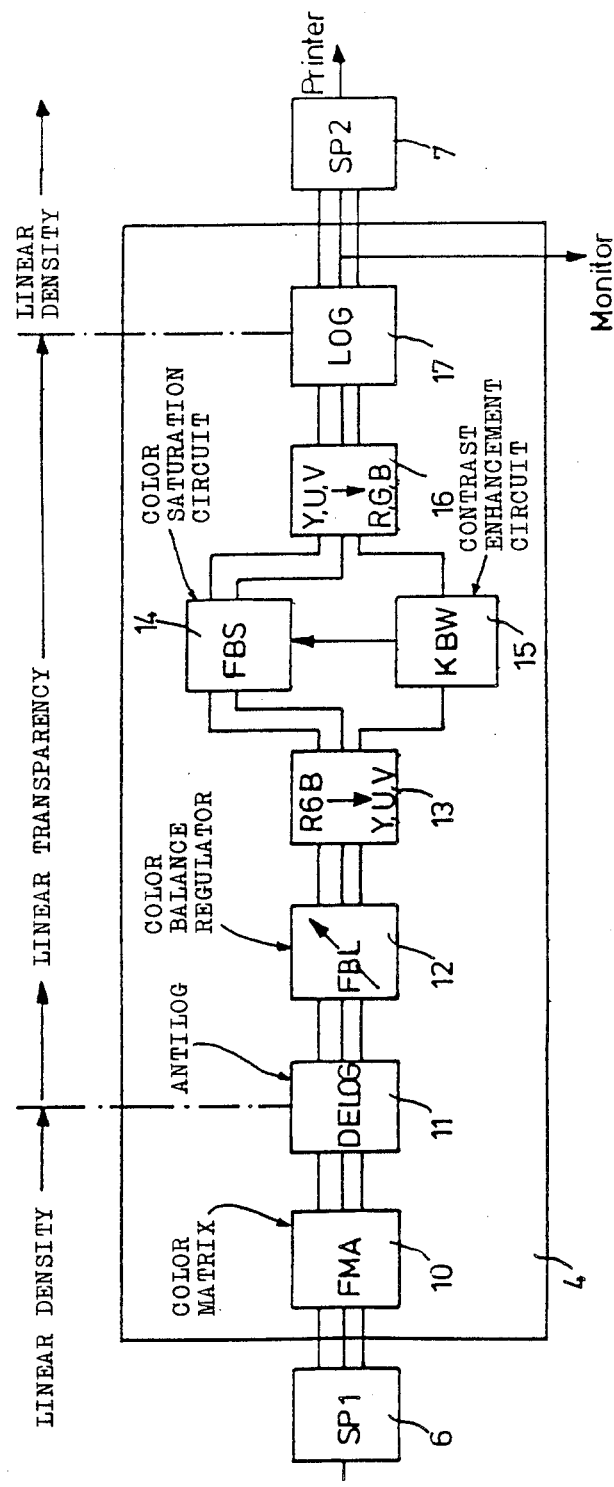
FIG. 2 is a schematic block diagram of the image processor in the image processing portion.

The image processing functions are explained in detail with reference to FIG. 2. An important feature is the image dependent adjustment of color saturation amplification with overmodulation limitation of minimization of color falsification (point b above). As shown in FIG. 2, the image processor encompasses elements 10 through 17. The image signals stored in image memory 6 (SP1) are fed to a color matrix 10, which serves to correct sidewise bleeding or slop-over of the dyes of the original images (cross-talk). The color matrix includes a programmed permanent (e.g. PROM = Programmable Read-Only Memory) memory in which each original image signal A (x,y) is associated with a corrected image signal A' (x,y). A memory programmed in this sense as a table is therefore referred to as a Look-Up Table (LUT for short). The aforementioned color corrections cannot be carried out before this point, because the image signals of all three color data RGB first become available in parallel after memory 6. Subsequently, antilogarithms of the linear density stored imaged signals are taken with the help of a Look-Up Table 11, so that, from this point on, linear transparency image signals are again available. With the color balance regulator 12, color deviations (e.g. color cast) which are not imposed by the system can be compensated or a deliberate deviation from the standardized gray scale (achromatic scale) can be achieved. In the following element 13, the RGB image signals are transformed into one color-independent brightness signal Y (luminance signal) and two brightness-independent color difference signals U, V (chrominance signals). The transformation is accomplished in the known manner according to the following equations:

$$Y = 0.3\,R + 0.6\,G + 0.1\,B$$

$$U = B - Y$$

$$V = R - Y.$$

This transformation presupposes linear transparency signals. By means of circuit 14, which are fed only the chrominance signals U, V, the color saturation can be adjusted or predetermined or automatically set in multiple steps or shades by keys at input 5. The luminance signal Y is fed through the lower channel shown in FIG. 2 into the contrast enhancement circuit 15 for modification or matching of gradation (global contrast processing) and, separately, enhancement of higher local frequencies (local contrast valuation). The modified chrominance and luninance signals are transformed back in element 16 into corresponding RGB-signals according to the inverse function of the aforementioned equations. The logarithms of these RGB signals are then taken in a logarithmic circuit 17, so that in the following signal processing, linear-density image signals are again provided.

The transformation RGB-to-YUV was adopted from video technology and has proven itself useful in electronic image processing in the present case. There are also other transformations which offer a pure brightness signal Y and two chrominance signals C1, C2 containing the color information. Among these, in particular, are the IHS-transformation and the lab-transformation. The details of these are set forth in the technical literature (see, e.g. pages 84–87 of *Digital Image Processing*, by W. K. Pratt, published by John Wiley & Sons). For the sake of simplicity, the following examples assume always that the RGB-to-YUV transformation is used. In describing the examples, the electronic measures in connection with the adjustment of color saturation amplification, in the manner perceived by the observer as optimal, will be explained. Of particular importance are the preventive measures which are undertaken in order to avoid the aforementioned color-falsifying overmodulation effects.

In the luminance-chrominance system, the color space is defined by the luminance axis Y and the two chrominance axes U and V. By this definition, a color vector F has a brightness or light density specifying component Y and two chrominance components U and V specifying only color content. One can thus limit oneself to a representation in the chrominance plane U, V in those cases when only a change in the color position (color tone and color saturation) is considered.

Figure 3:
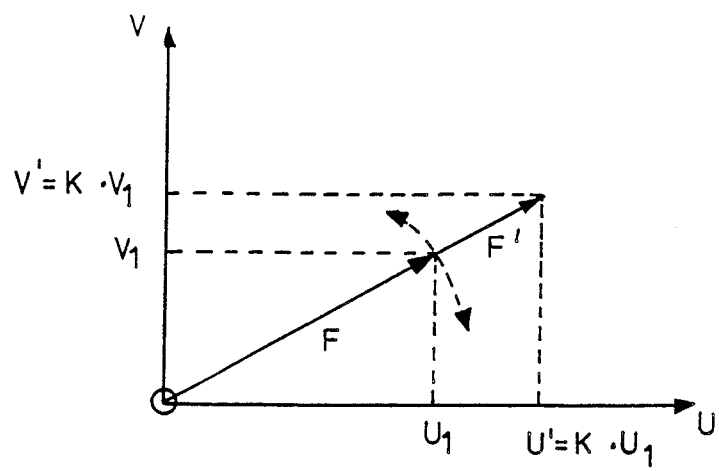
FIG. 3 represents a color vector in chrominance plane U,V.

FIG. 3 illustrates a color vector F with components $U_1$ and $V_1$. The origin of the coordinates (U=O, V=O) corresponds to the achromatic point or gray point. If one deviates from the straight line defined by the vector F (dashed arrow), one ends up at another color tone. On the other hand, if one lengthens vector F by multiplication by the constant factor k (new vector $F' = k \cdot U_1, k \cdot V_1$), the color saturation is increased while the color tone remains the same. It follows that colors with a low degree of color saturation lie near the origin of the U, V chrominance plane, while the more strongly saturated colors lie farther out. An intended saturation increase means that the chrominance components $U_1$, $V_1$ of a color vector F are multiplied by a specified amplification factor k. The amplification factor k can be adjusted continuously, e.g. with a potentiometer, or stepwise using a keypad, and can thereby be optimally adjusted. In practice, the color channels R, G, B (cf. FIG. 2) have a limited modulation range. As long as the enhanced saturation in both chrominance channels remains within this modulation range, no problems arise. However, when the modulation limit is exceeded, one must cope with non-linear overmodulation effects. This will be explained with reference to FIG. 4.

Figure 4:
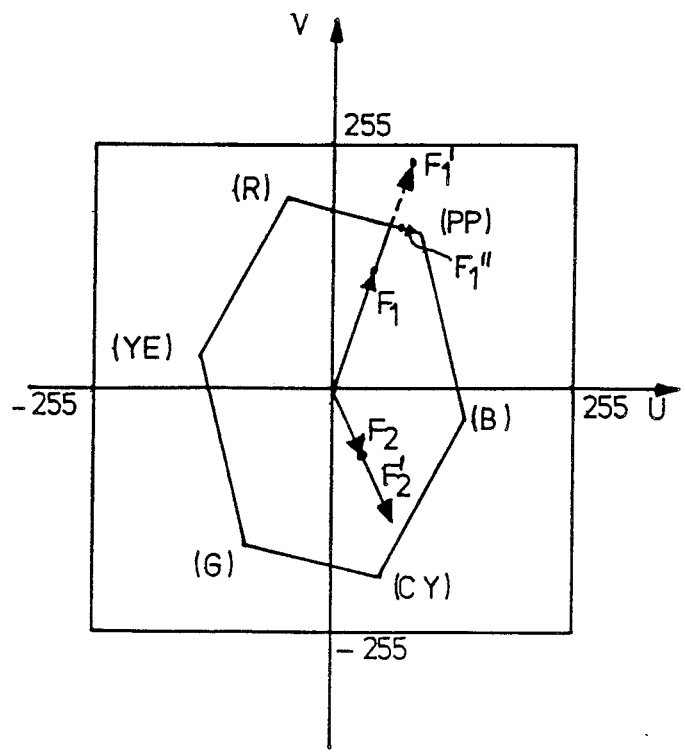
FIG. 4 illustrates the system-imposed value range of the RGB color space in the chrominance plane U, V and the consequences of an overmodulation.

FIG. 4 illustrates the channel limits for the chrominance signals. The values are represented by 8 bits, so $2^8$ absolute values are possible, ranging from 0 through 255 ($2^8 - 1$), with a 9th bit used as a sign bit. Altogether, values from −255 to +255 can be represented. Within this square is plotted the color space which can be transmitted through the RGB channels, in the form of a symmetrical six-sided figure, whose corner points corresponds to the colors red, yellow, green, cyan (aqua), blue, and purple, known from video technology. Details are set forth in the aforementioned book by H. Lang, *Farbmetrik und Farbfernsehen*, page 333. The available value range for the chrominance vectors within the RGB-space corresponds to the surface enclosed by the six-sided figure. Both the chrominance vectors $F_1$ and $F_2$ shown are within the six-sided figure. If, for example, the color saturation is increased by a factor of 2, the color vector $F_1$ multiplied in length by the factor 2 will exceed the modulation limit (new vector $F_1'$), while the smaller color vetorr $F_2$ remains inside the six-sided figure (new vector $F_2'$).

The overshooting of the modulation limit upon amplification of $F_1$ leads to the result that the color vector deviates along the modulation boundary to the purple point PP (new vector $F_1''$) since the vector $F_1'$ cannot be represented. This causes an undesirable degradation of the color tone, i.e. a color falsification. Upon excessive color saturation increase, the color vector therefore deviates toward the primary colors red, green, blue, or the mixed-color points yellow, cyan (aqua), purple.

What makes this particularly serious is the fact that the color vectors, which in relation to color tone are relatively slightly differentiated, but already have a relatively high saturation, tend in the case of overmodulation to deviate along the modulation boundary practically to one point when further amplified. This causes the originally present color contrasts to be lost. Gross, clumped color structures result, because in the extreme case only six colors remain available, i.e. the color value range is sharply reduced.

The solution is a circuit, operating in the chrominance channel, which serves to reduce or limit the amplification, whenever the color vector is on or near the modulation boundary.

Figure 5:
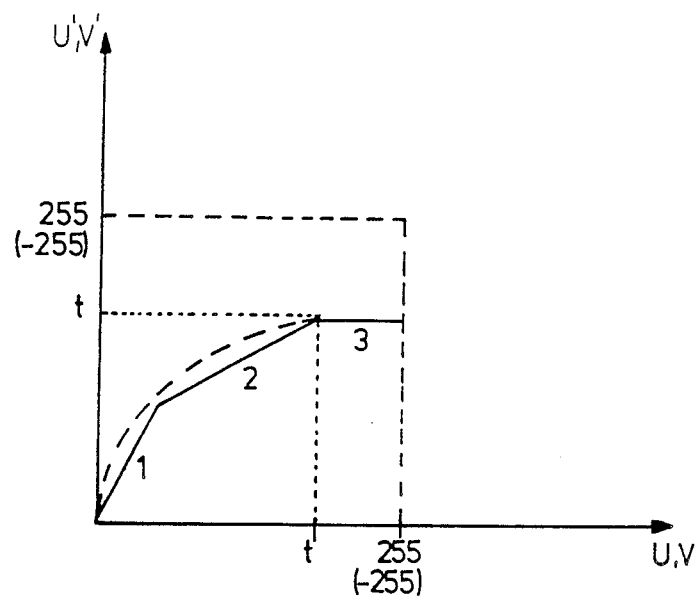
FIG. 5 illustrates the amplification characteristic curve which controls the chrominance signals U, V.

This is accomplished with the aid of amplifier circuits in both chrominance channels U, V, which have a sublinear characteristic curve as shown in FIG. 5. The curve has a slope which decreases as the amplitude increases. It can be steadily curved (dashed line) or have discrete segments 1, 2, 3 of differing slopes.

Above a pre-selected boundary value t, the curve runs horizontal in its third segment; here, no further amplification of the saturation occurs. The boundary value is preferably selected to be somewhat less than the modulation boundary (FIG. 4) so that, upon saturation amplification, as many values U', V' as possible fall within the permitted value range. In practice, the boundary value t falls between 150 and 200. The slope of the first curve segment is approximately between 1 and 3. The slope of the second segment is only about 0.3 to 1. Such an amplification characteristic curve has the result that, in both chrominance channels, small signals are more amplified than larger signals corresponding to a higher degree of saturation, and that, upon reaching the threshold t, no further amplification takes place. By these means, for the majority of the image signals, the values U', V' are limited to the allowed region of FIG. 4. As a rule, overmodulation is avoided.

Figure 6:
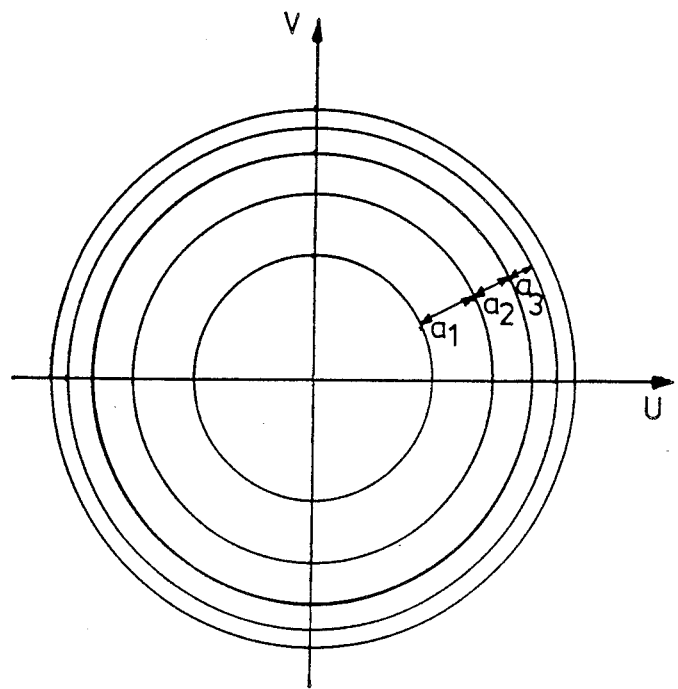
FIG. 6 illustrates the saturation steps in the chrominance plane with subjectively equal saturation differences (qualitative representation!)
Figure 7:
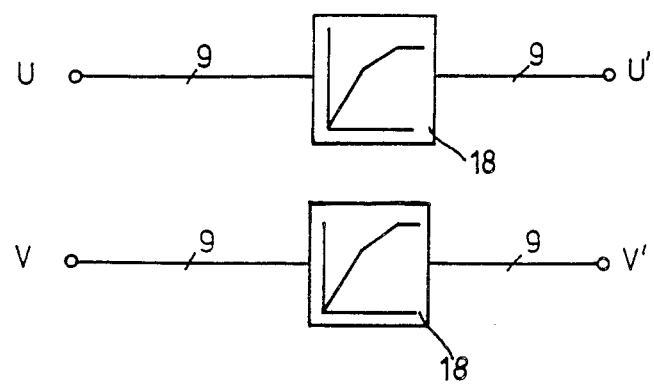
FIG. 7 is a graph illustrating in principle how to implement a sublinear modulation-limited transfer characteristic curve in the chrominance channels.

This sublinear amplification has the additional advantage that matching to the physiological color contrast sensitivity of the eye is achieved. FIG. 6 qualitatively illustrates how the sensitivity of the human eye to perception of saturation differences declines with increasing saturation. In the diagram, lines of equal saturation (circles) are illustrated, with the spacing of the circles representing saturation differences $a_1 > a_2 > a_3$, which (qualitatively) correspond to the the same differences regarding color saturation sensitivity. The characteristic curve of FIG. 5 thus achieves both an improved, physiologically matched image enhancement and an enhancement of color contrasts.

The sublinear characteristic curve and the modulation boundary are preferably implemented by means of a Look-Up Table 18 in each of the chrominance channels U and V, i.e. the color saturation circuit 14 of FIG. 2 comprises, in this case, the two LUT's 18. The LUT's are loaded with the same memory contents.

Upon great amplification (strong enhancement of color saturation) color falsifications can still occur in this apparatus, in the direction of the nearest primary colors or nearest mixed-color points. Such color falsifications are most to be expected when chrominance signals U, V are treated with differing characteristic line segments (cf. FIG. 5). A further source of error is that the value range for the chrominance signals U, V, and thus also the modulation boundaries, are dependent upon the respective luminance signal Y. One can therefore achieve a significant improvement in the image quality in connection with electronic correction or enhancement of color saturation if one works, not with a constant modulation boundary, but with modulation boundaries which are adjusted in accordance with the transformation equations for the chrominance components, in dependence upon the luminance signal Y. This can be seen more clearly with reference to FIGS. 9 and 10. According to the transformation equations RGB-to-YUV (see page 11), the following is true in the value range of U, V:

$$-Y \leq U \leq 255 - Y$$

$$= -Y \leq V \leq 255 - Y.$$

Figure 9:
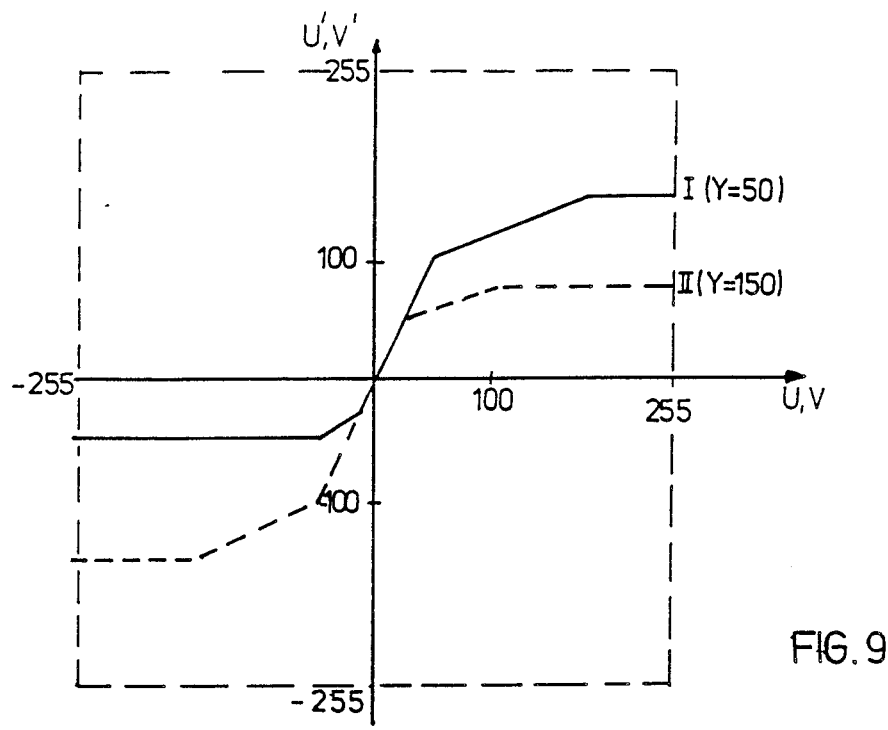
FIG. 9 illustrates the characteristic curve field controlling transfer of the chrominance signals according to FIG. 8.

Due to this dependence, one must provide—as shown in FIG. 9—various characteristic curves with differing modulation boundaries, for various brightness steps. Thus, for example, in case of a luminance signal Y=50, the characteristic I is used for saturation amplification, while in the case of a luminance signal Y=150, one switches to characteristic II. In the case of characteristic II, the change to a horizontal segment is made at a significantly lower boundary value, so that beyond this value no further amplification occurs.

Figure 10:
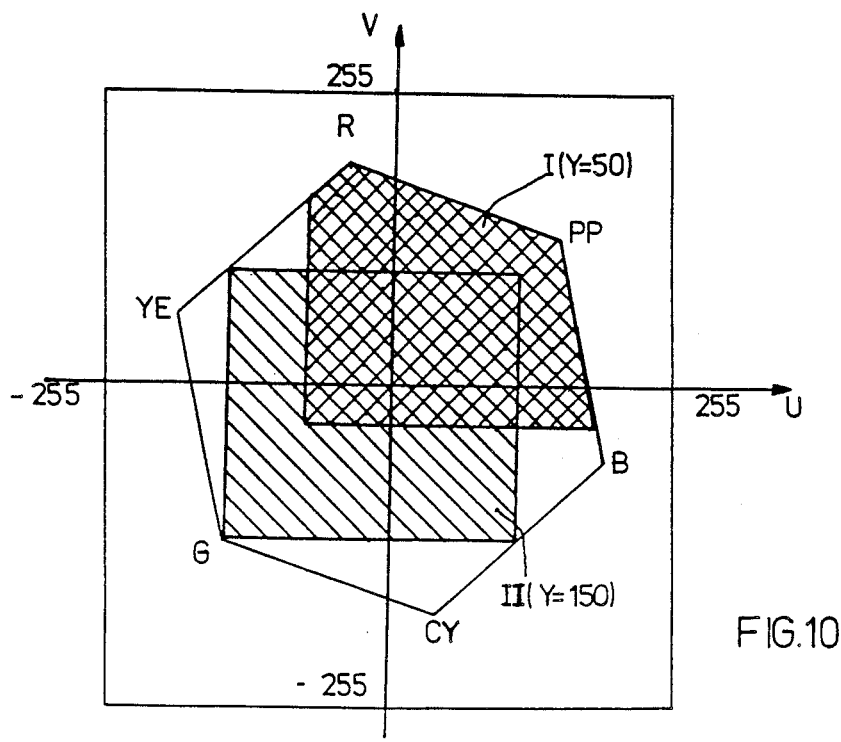
FIG. 10 illustrates the value regions, defining the characteristic curve field of FIG. 9, for the chrominance signals, U, V, at various luminance values Y.

The value ranges corresponding to the two characteristics I and II for U, V are sketched in over the six-sided figure in FIG. 10. The value range I (cross hatched) represents Y=50 and the value range II (striped) represents Y=150.

Figure 8:
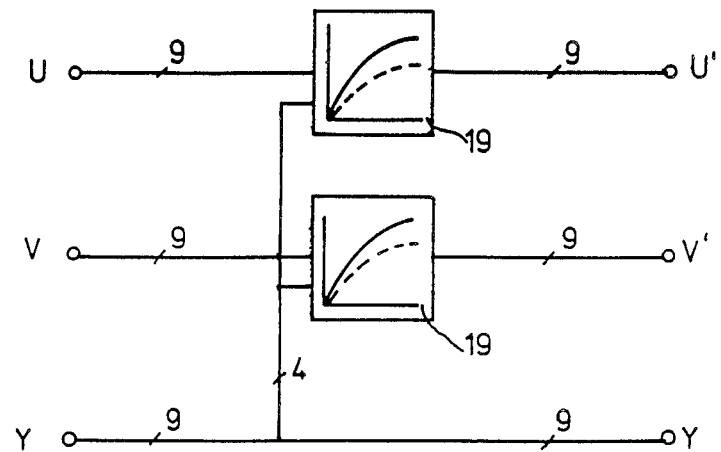
FIG. 8 is a graph illustrating in principle how to make the chrominance signals dependent upon the luminance signal, in implementing a sublinear modulation-limited transfer characteristic curve in the chrominance channels.

In terms of circuitry, the dependence of the modulation boundary on the luminance value Y is implemented by means of a three-dimensional LUT 19 in the chrominance channels U, V, according to FIG. 8. LUT 19 contains multiple characteristics corresponding to the the various brightness levels. Upon transition to another gray-value step, the LUT 19 references a new characteristic. The factoring-in of the dependence of the modulation boundary on the luminance signal is indicated in FIG. 2 by the connection from the contrast valuation circuit 15 to the color saturation circuit 14, and is indicated in FIG. 8 by the connections from the luminance channel to the two LUT's.

Figure 11:
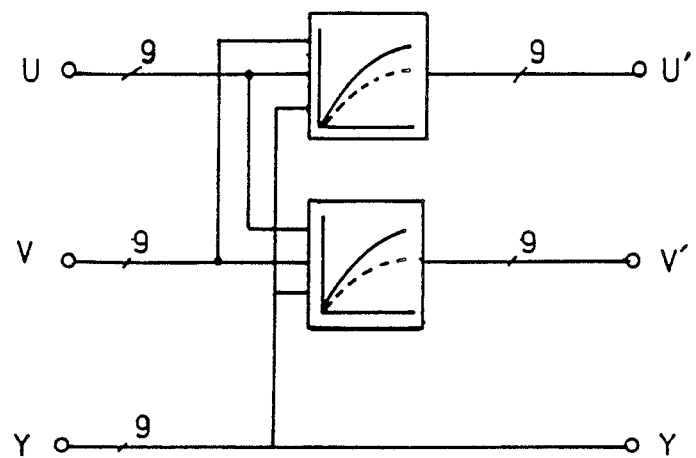
FIG. 11 is a block diagram for saturation amplification, according to an optimal solution, in the chrominance channels, factoring in dependence of both chrominance signals, which may alternate upon occurrence of overmodulation.

With the saturation amplification system of FIGS. 8 to 10, in the case of most image structures, one can achieve a pleasing image enhancement by enhancing the saturation. Only under particularly unfavorable conditions are color falsifications still visible, if one chrominance component is very large in relation to the other, and correspondingly the lower characteristic line segment is used for the small chrominance component and the upper characteristic line segment, near the modulation boundary, is used for the large chrominance component. This source of error can be suppressed by providing that, when the modulation boundary is reached in one chrominance channel, no further amplification occurs in either channel, i.e. in the other, notyet-completely-modulated channel, the amplification is limited to that in the completely modulated channel. This optimization can be purchased only with a substantially increased hardware investment and a prolonged operational cycle. In order to factor in the bi-directional dependence of the chrominance channels U, V on the modulation boundary and the dependence of the modulation boundaries on the luminance signal Y, one needs a four-dimensional LUT 10 in each of chrominance channels U, V, as shown in FIG. 11. This expensive solution, with its unsymmetrical signal processing in the two channels, would be used only in those exceptional cases when extreme requirements are placed on the image quality.

I claim:

1. Method of adjusting color saturation in electronic image processing, in which a two-dimensional original image is electro-optically scanned along rows and columns for three primary colors, R, G and B, image signals for the three primary colors are generated and said image signals are transformed into a luminance signal Y and two chrominance signals C1, C2, characterized in that a pre-selected adjustment of color saturation is used, in which, in accordance with a non-linear characteristic curve, small chrominance signals C1, C2 are amplified more than larger chrominance signals C1, C2 corresponding to a higher degree of saturation, said characteristic curve having a slope which decreases with increasing chrominance signal amplitude and said characteristic curve running horizontally beyond a predetermined boundary value of the chrominance signals C1, C2.

2. Method according to claim 1, wherein said predetermined boundary value is adjusted in dependence upon the value of the luminance signal Y in accordance with transformation equations for the chrominance signals C1, C2.

3. Method according to claim 2 wherein two chrominance channels are provided for amplifying said two chrominance signals C1, C2 and when the signal in one of the chrominance channels reaches said predetermined boundary value, no further amplification occurs in said one channel and the amplification in the other of said channels is limited to the value reached when the signal in said one channel reached said predetermined boundary value.

4. Method according to claim 1, wherein two chrominance channels are provided for amplifying said two chrominance signals C1, C2 and when the signal in one of the chrominance channels reaches said predetermined boundary value, no further amplification occurs in said one channel and the amplification in the other of said channels is limited to the value reached when the signal in said one channel reaches said predetermined boundary value.

5. Method of adjusting color saturation in electronic image processing, in which a two-dimensional original image is electro-optically scanned along rows and columns for three primary colors R, G and B, image signals for the three primary colors are generated and said image signals are transformed into a luminance signal Y and two chrominance signals C1, C2, characterized in that a pre-selected adjustment of color saturation is used, in which, in accordance with a non-linear characteristic curve, small chrominance signals C1, C2 are amplified more than larger chrominance signals C1, C2 corresponding to a higher degree of saturation, and in that the three image signals for the primary colors R, G and B are transformed into a luminance signal Y and two chrominance signals U, V in accordance with the equations $Y=0.3\ R+0.6\ G+0.1\ B$, $U=B-Y$ and $V=R-Y$, said characteristic curve having decreases with increasing chrominance signal amplitude and said characteristic curve running horizontally beyond a predetermined boundary value of the chrominance signals C1, C2.

6. Method according to claim 5, wherein said predetermined boundary value is adjusted in dependence upon the value of the luminance signal Y in accordance with transformation equations for the chrominance signals C1, C2.

7. Method according to claim 6, wherein two chrominance channels are provided for amplifying said two chrominance signals C1, C2 and when the signal in one of the chrominance channels reaches said predetermined boundary value, no further amplification occurs in said one channel and the amplification in the other of said channels is limited to the value reached when the signal in said one channel reached said predetermined boundary value.

8. Method according to claim 5, wherein two chrominance channels are provided for amplifying said two chrominance signals C1, C2 and when the signal in one of the chrominance channels reaches said predetermined boundary value, no further amplification occurs in said one channel and the amplification in the other of said channels is limited to the value reached when the signal in said one channel reached said predetermined boundary value.

* * * * *